US011902964B2

(12) United States Patent
Johansson et al.

(10) Patent No.: US 11,902,964 B2
(45) Date of Patent: Feb. 13, 2024

(54) NETWORK NODE AND METHOD PERFORMED THEREIN FOR SCHEDULING USER EQUIPMENT IN UPLINK

(71) Applicant: TELEFONAKTIEBOLAGET LM ERICSSON (PUBL), Stockholm (SE)

(72) Inventors: Mats Johansson, Spånga (SE); Govardhan Madhugiri, Solna (SE); David Better, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 419 days.

(21) Appl. No.: 17/277,768

(22) PCT Filed: Nov. 26, 2018

(86) PCT No.: PCT/SE2018/051211
§ 371 (c)(1),
(2) Date: Mar. 19, 2021

(87) PCT Pub. No.: WO2020/111985
PCT Pub. Date: Jun. 4, 2020

(65) Prior Publication Data
US 2022/0124754 A1 Apr. 21, 2022

(51) Int. Cl.
*H04W 72/1268* (2023.01)
*H04W 72/02* (2009.01)
(Continued)

(52) U.S. Cl.
CPC ....... *H04W 72/1268* (2013.01); *H04W 72/02* (2013.01); *H04W 72/0446* (2013.01); *H04W 72/0453* (2013.01)

(58) Field of Classification Search
CPC ............. H04W 72/23; H04W 72/0453; H04W 72/1268; H04W 72/02; H04W 72/0446;
(Continued)

(56) References Cited

U.S. PATENT DOCUMENTS

2013/0083755 A1 4/2013 Berberana et al.
2019/0260530 A1* 8/2019 Yi ........................... H04L 5/001
(Continued)

FOREIGN PATENT DOCUMENTS

| CN | 102884856 A | 1/2013 |
|----|-------------|--------|
| EP | 2802182 A1 | 11/2014 |
| WO | 2018084571 A1 | 5/2018 |

OTHER PUBLICATIONS

International Search Report / Written Opinion dated Sep. 16, 2019 in related/corresponding PCT Application No. PCT/SE2018/051211.
(Continued)

*Primary Examiner* — Dady Chery
(74) *Attorney, Agent, or Firm* — PATENT PORTFOLIO BUILDERS PLLC

(57) ABSTRACT

The embodiments herein relate to a method performed by a network node, for scheduling of a UE in UL. The network node is configured to schedule the UE using Frequency
(Continued)

Selective Scheduling or resource fair scheduling. The network node estimates a PRBs for individual UEs, which are scheduled in the same cell and TTI. The network node determines whether the estimated number of PRBs fulfil one or more predetermined conditions. The network node determines to schedule the UEs using FSS when at least one of the one or more conditions are fulfilled, and determining to schedule the UEs using resource fair scheduling when none of the one or more predetermined conditions are fulfilled.

15 Claims, 10 Drawing Sheets

(51) Int. Cl.
*H04W 72/0446* (2023.01)
*H04W 72/0453* (2023.01)

(58) Field of Classification Search
CPC ..... H04L 5/001; H04L 5/0037; H04L 5/0039; H04L 5/0041; H04L 5/0044; H04L 5/0057; H04L 5/0094; H04L 5/0098; H04L 5/0007; H04L 5/0053
See application file for complete search history.

(56) References Cited

U.S. PATENT DOCUMENTS

2020/0359362 A1* 11/2020 Yi ..................... H04L 5/0094
2022/0191844 A1* 6/2022 Yi ..................... H04L 5/0094

OTHER PUBLICATIONS

Nokia et al., "On resource allocation for POSCH and PUSCH in NR," 3GPP Draft; RI-1718620 Data Resource Allocation Final, 3rd Generation Partnership Project (3GPP), vol. RAN WGI, Prague, CZ; Oct. 9-13, 2017, Retrieved from the Internet: URL:http://www.3gpp.org/ftp/Meetings_3GPP_SYNC/RANI/Docs, 10 pages.

Nokia et al., "On resource allocation in frequency domain for POSCH and PUSCH in NR," 3GPP Draft; RI-1714007, Resource Allocation in Freq Domain Final, 3rd Generation Partnership Project (3GPP), vol. RAN WGI, Prague, Czech Republic Aug. 20-25, 2017, Retrieved from the Internet: URL:http://www.3gpp.org/ftp/Meetings -3GPP-SYNC/RANI/Docs, 6 pages.

Nokia, "Frequency-domain user-multiplexing for the E-UTRAN downlink," 3GPP Tsg Ran WG1 Lte Ad Hoc Meeting R1-060188 Helsinki, Finland, Jan. 23-25, 2006, 7 pages.

Office Action dated Nov. 22, 2023 in corresponding/related Chinese Application No. 201880099782.5.

* cited by examiner

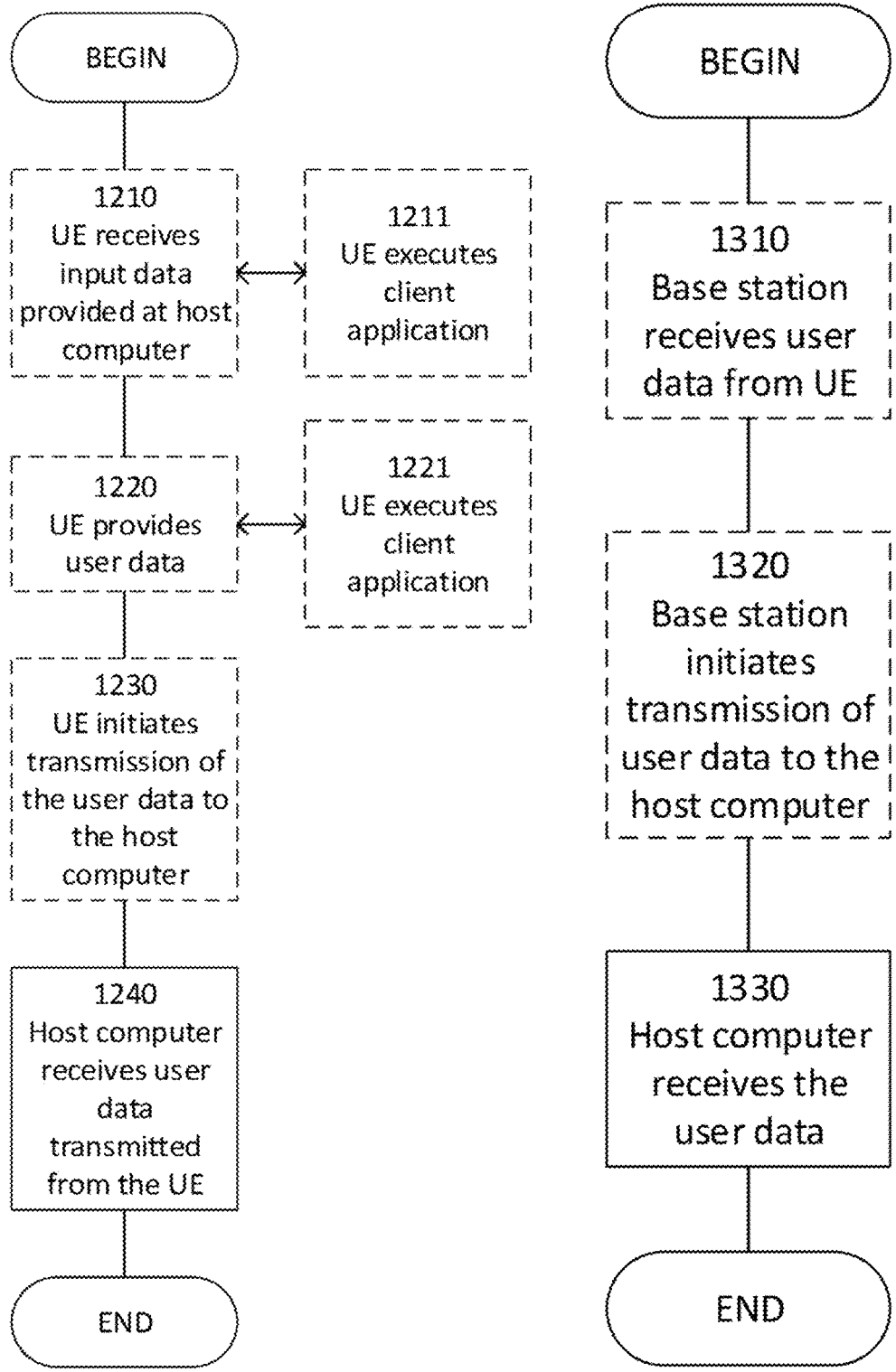

NETWORK NODE AND METHOD PERFORMED THEREIN FOR SCHEDULING USER EQUIPMENT IN UPLINK

TECHNICAL FIELD

Embodiments herein relate to a network node and a method performed therein for scheduling User Equipment (UE) in an Uplink (UL).

BACKGROUND

In a typical wireless communication network, wireless devices, also known as wireless communication devices, mobile stations, stations (STA) and/or User Equipment (UE), communicate via an access Network such as a Radio Access Network (RAN) with one or more core networks (CN) or a Wi-Fi network. The RAN covers a geographical area which is divided into service areas or cell areas, which may also be referred to as a beam or a beam group, with each service area or cell area being served by a radio network node such as a radio access node e.g., a radio base station (RBS) or a Wi-Fi access point, which in some networks may also be denoted, for example, a NodeB, eNodeB (eNB), or Next Generation NodeB (gNB) as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Scheduling is a very important functionality of evolved NodeB, such as e.g. eNB and/or gNB in LTE/NR or any mobile communications technology. Scheduling allows for efficient accommodation of UEs over time-frequency resources for data transmission. Scheduling is done for Downlink (DL) and Uplink (UL) transmission. Scheduler implementation is network provider specific. The most ideal scheduler is the one which tries to achieve optimal capacity and performance in the network. Frequency selective scheduling (FSS) is one of the currently available scheduling techniques which bases its scheduling decision on the frequency selectivity of the radio channel. FSS can be employed in UL or DL or both. Scheduling in UL for LTE/NR is contiguous, which means that UEs are given a designated number of Physical Resource Blocks (PRBs) which can be used for UL transmissions continuously. Existing FSS in UL is based on relevant channel frequency information for each of the PRBs. PRBs with the most suitable Signal to Interference and Noise Ratio (SINR) are considered for scheduling which helps in reliable transmission of data in UL. Frequency selectivity uses the diversity in frequency to schedule UEs. There are other scheduling schemes in UL such as e.g. resource fair. The resource fair scheduling scheme can also be employed in UL and/or DL. In this scheme the UEs are scheduled such that they are placed next to each other in the spectrum without having any spectrum gaps. There is no frequency selectivity involved in the resource fair scheduling, but the spectrum utilization is efficient in comparison to FSS.

Bandwidth is a limited resource and often very expensive, and it is therefore important that a network provider offers products and procedures which utilize the bandwidth efficiently. Employing FSS in UL causes fragmentation of bandwidth. As UL transmission in LTE/NR is contiguous in nature and if UEs with small grant sizes are scheduled in the middle of the bandwidth spectrum then some or most part of the remaining spectrum might be left unused for other schedulable UEs which will cause fragmentation. Most of the existing FSS algorithms in UL try to address reliable transmission in UL by selecting PRBs suitable for UEs experiencing different radio conditions without causing fragmentation of the bandwidth. This use of diversity over frequency helps in reliable UL transmission but the risk of underutilization of bandwidth is high due to fragmentation. The resource fair scheduling scheme doesn't pose any spectrum fragmentation but it neither uses the frequency selectivity to improve data transmission reliability.

SUMMARY

It is an object of embodiments herein to enhance performance of a wireless communications network, in particular by providing a mechanism which obtains frequency selectivity and while still ensuring that the UL bandwidth is utilized efficiently with no or limited fragmentation. The bandwidth shall herein be interpreted as the number of PRBs (herein denoted Nprb) available for scheduling UEs.

According to a first aspect of the embodiments herein the object is achieved by a method performed by a network node, for scheduling of at least one UE in UL. The network node is configured to schedule the at least one UE using FSS or resource fair scheduling. The network node estimates a number of PRBs for the at least one individual UEs. The individual UEs are scheduled in the same cell and Transmit Time Interval, TTI. The network node determines whether the estimated number of PRBs fulfil one or more predetermined conditions. The network node determines to schedule the at least one UEs using FSS when at least one of the one or more conditions are fulfilled, and determines to schedule the at least one UEs using resource fair scheduling when none of the one or more predetermined conditions are fulfilled.

According to a second aspect of the embodiments herein the object is achieved by a network node, for scheduling of at least one UE in UL. The network node is configured to schedule the at least one UE using FSS or resource fair scheduling. The network node is configured to estimate a number of PRBs for the at least one individual UEs, which are scheduled in the same cell and TTI. The network node is configured to determine whether the estimated number of PRBs fulfil one or more predetermined conditions. The network node is configured to determine to schedule the at least one UEs using FSS when at least one of the one or more conditions are fulfilled, and determining to schedule the at least one UEs using resource fair scheduling when none of the one or more predetermined conditions are fulfilled.

According to a third aspect of the embodiments herein the object is achieved by a computer program product comprising instructions, which when executed by at least one processor, causes the at least one processor to perform the method according to the first aspect of embodiments herein.

According to a fourth aspect of the embodiments herein the object is achieved by a carrier comprising the computer program product according to the third aspect of embodiments herein, wherein the carrier is one of an electronic signal, an optical signal, an electromagnetic signal, a magnetic signal, an electric signal, a radio signal, a microwave signal, or a computer-readable storage medium.

By taking the actual condition of the UEs to be scheduled into account, the embodiments herein have the advantage that the use of FSS is ensured whenever the fragmentation of the spectrum and the spectrum utilization is not negatively affected by the FSS. Thereby the cell throughput and the PRB utilization is increased while reducing the band edge interference for the scheduled UEs.

BRIEF DESCRIPTION OF THE DRAWINGS

The embodiments herein will now be described and explained in more detail in relation to the enclosed drawings, in which:

FIG. 12 is a flowchart depicting methods implemented in a communication system including a host computer, a base station and a user equipment in accordance with some embodiments;

FIG. 13 is a flowchart depicting methods implemented in a communication system including a host computer, a base station and a user equipment in accordance with some embodiments.

DETAILED DESCRIPTION

Figure 1:
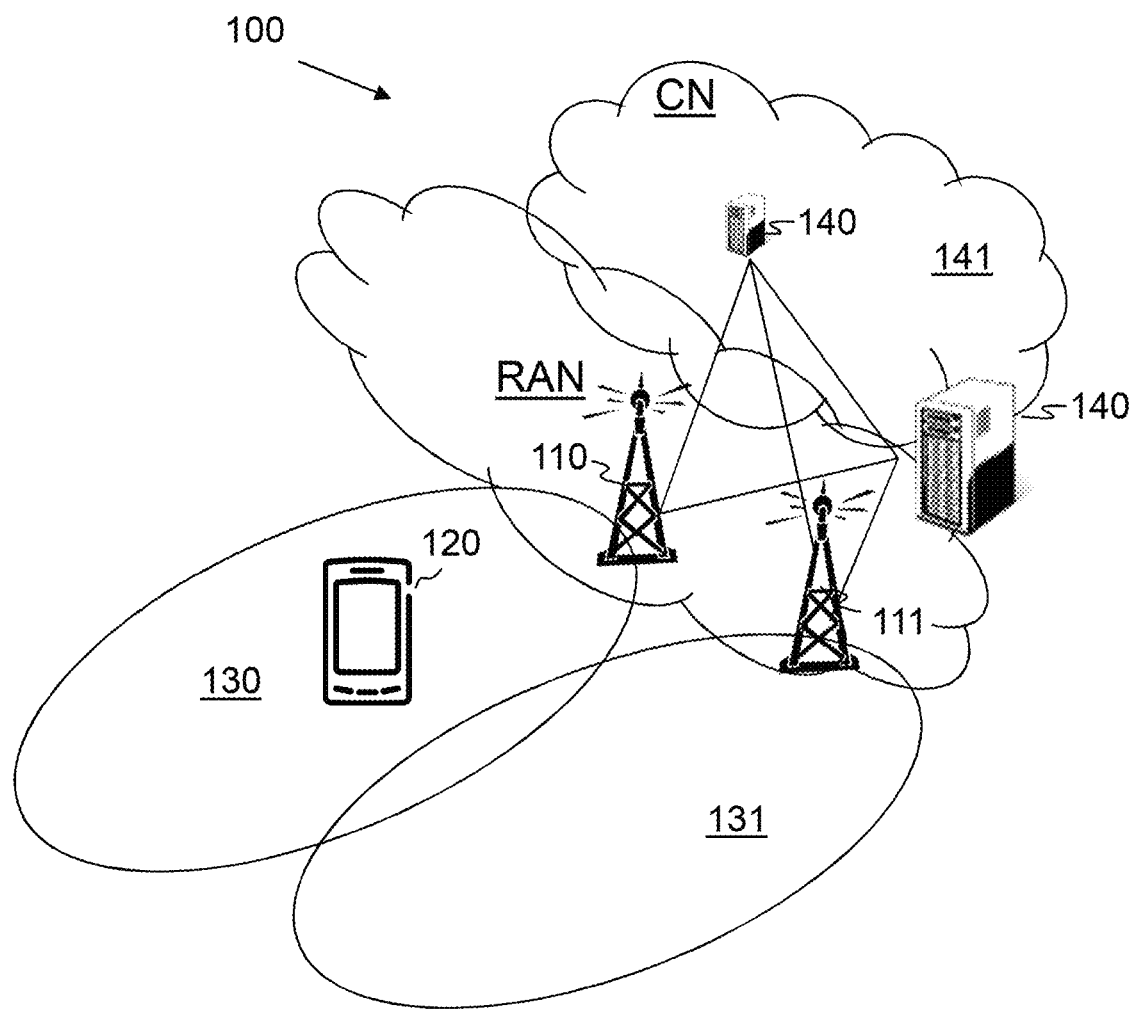
FIG. 1 is a schematic overview depicting a wireless communications network.

FIG. 1 depicts an example of a communications network 100 according to a first scenario in which embodiments herein may be implemented. The communications network 100 is a wireless communication network such as e.g. a 5G, LTE, E-Utran, WCDMA, GSM network, any 3GPP cellular network, Wimax, or any cellular network or system.

The communications network 100 comprises a Radio Access Network (RAN) and a Core Network (CN). The communication network 100 may use any of a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB), or Wi-Fi, just to mention a few possible implementations. In the communication network 100, one or more UEs 120 may communicate via one or more Access Networks (AN), e.g. RAN, with one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, including the two shown radio network nodes 110, 111 each providing radio coverage over one or more geographical areas, such as a cell 130, 131, using a radio access technology (RAT), such as 5G, LTE, UMTS, Wi-Fi or similar. The radio network node 110, 111 may be a radio access network node such as a radio network controller or an access point such as a wireless local area network (WLAN) access point or an Access Point Station (AP STA), an access controller, a base station, e.g. a radio base station such as a gNB, NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the radio access technology and terminology used.

The CN further comprises a core network node 140 which is configured to communicate with the radio network nodes 110, 111, via e.g. an S1 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The UE 120 is located in the cell 130 of the network node 110, which is referred to as the serving cell, whereas the cell 131 of the network node 111 is referred to as a neighboring cell. Although, the network node 110 in FIG. 1 is only depicted providing radio coverage in a serving cell 130, the same network node 110 may further provide radio coverage in one or more neighboring cells 131 in addition to the serving cell 130.

The UE 120 may further be configured to communicate over a plurality of different RATs, such as LTE, UMTS, Wi-Fi or similar.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

The embodiments disclosed herein employ a procedure, which may be referred to as a toggle mechanism, to make sure that FSS is used whenever the fragmentation of the spectrum and spectrum utilization is not negatively affected by the FSS. The toggle mechanism may adaptively switch between FSS and resource fair scheduling based on an estimated number of PRBs for individual UEs which are scheduled in UL in the same cell and TTI. This adaptive toggling may also be referred to as Evolved UL Frequency selective scheduling (eUIFss). The eUIFss helps to achieve reduced or no fragmentation of BW in UL for LTE/NR. The band edge interference is reduced substantially, since FSS schedules the UEs 120 in the parts of the BW that has the best radio conditions, i.e. in the frequency spectrum where the radio conditions for UL transmission are the best. The eUIFss reduces fragmentation and still utilize the diversity benefit of FSS which results in increased capacity and performance. The main benefits of eUIFss are that:

The cell throughput while using eUIFss is increased compared to legacy methods, such as UIFss, for scheduling UEs.

The PRB utilization is higher in eUIFss compared to legacy methods for scheduling UEs.

The band edge interference is reduced.

Figure 2:
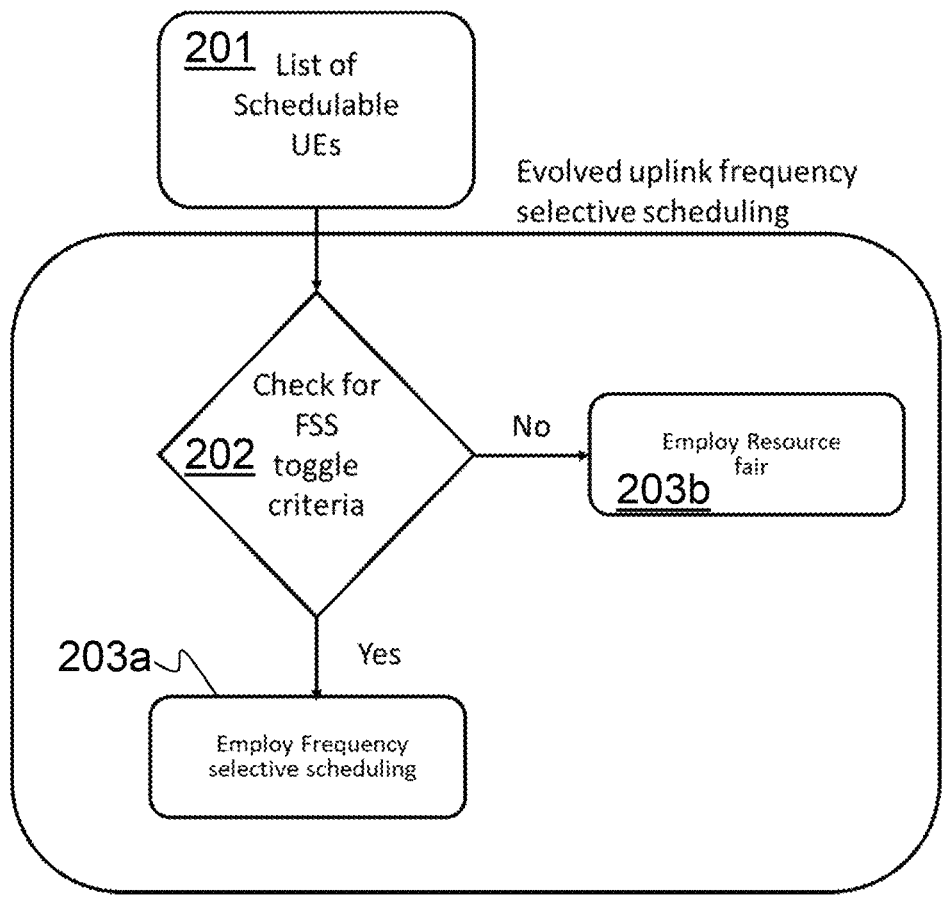
FIG. 2 is a flowchart depicting Evolved UL Frequency selective scheduling which may be used in embodiments herein.

Exemplary method steps of the eUIFss are shown in FIG. 2.

Action 201: The network node 110 obtains a list of schedulable UEs 120. Based on the list of schedulable UEs 120, the network node 110 estimates the number of PRBs that can be used for each individual UE 120.

Action 202: Based on the estimated number of schedulable UEs 120 and the estimated number of PRBs for each individual UE 120, the network node 110 checks for an FSS toggle criteria. The toggle criteria may be that at least one of one or more conditions indicates that the UEs 120 are to be scheduled using FSS. Some example conditions for deciding when to use FSS and when to use resource fair scheduling, respectively, are listed below:

1. If the estimated number of schedulable UEs is only one, then always use FSS.
2. Assume A and B are two UEs which need to be scheduled, if estimated PRBs for these UEs satisfy $A/2+B \leq Nprb/2$ then use FSS, else use resource fair scheduling.
3. If there are three Schedulable UEs in UL, then check for "$A/2+B/2+C \leq Nprb/4$", if this condition is satisfied then employ FSS, else use resource fair scheduling.
4. If the Sum of all the estimated PRBs is less than or equal to a "threshold" times the bandwidth then use FSS, else use resource fair scheduling. If $(A+B+C \ldots) \leq (threshold \times Nprb)$ is true use FSS, else use Resource fair scheduling. (Threshold is a value between 1-100 which is configurable and is in percentage).
5. If estimated PRBs of all the Schedulable UEs in UL is less than or equal to "threshold" times bandwidth then use FSS, else use resource fair scheduling. If $\{(A \leq threshold \times Nprb) (B \leq threshold \times Nprb)\}$ is true then choose FSS, else use resource fair scheduling.
6. If Max estimated PRBs of a Schedulable UE is less than or equal to total sum of all the remaining estimated PRBs of Schedulable UEs and Total sum of all the estimated PRBs is less than or equal to Nprb then use FSS, else use resource fair scheduling. This condition may also be expressed as:

If (MaxEstimatedPRB_UEx<=EstimatedPRBUEn-1+ EstimatedPRBUEn-2 . . . . EstimatedPRBUEn-(n-1) && (SumEstimatedPRB (n+n-1+n-2+n-(n-1))<=Nprb)) {FSS} else {Resource Fair}

The MaxEstimatedPRB_UEx is the schedulable UE with the maximum number of estimated PRBs. SumEstimatedPRB is the sum of all PRBs across all the schedulable UEs in UL in a given TTI in a specific cell.

Action 203a: When at least one of the one or more conditions indicates that the UEs 120 are to be scheduled using FSS, the UEs 120 are scheduled using FSS.

Action 203b: When none of the one or more conditions indicates that the UEs 120 are to be scheduled using FSS, i.e. when all of the conditions indicate that the UEs 120 are to be scheduled using resource fair scheduling, the UEs 120 are scheduled using resource fair scheduling.

Some actions performed by the network node 110, in a method for scheduling of at least one UE 120 in the UL, according to embodiments herein will now be described with reference to a flowchart depicted in FIG. 3. The actions in this figure do not have to be taken in the order stated below, but may be taken in any suitable order. Actions that should be performed in some embodiments only are marked with dashed boxes. The network node 110 is configured to schedule UEs using FSS or resource fair scheduling, i.e. the network node 110 may decide which type of scheduling out of FSS and resource fair scheduling to use.

Action 3010: The network node 110 estimates, which may also be referred to as determines, a number of PRBs for the at least one individual UEs, wherein the individual UEs 120 are scheduled in the same cell and TTI. The network node 110 may e.g. estimate the number of PRBs based on an obtained list of schedulable UEs 120. This action 3010 is similar to the action 201 and 202 described above in relation to FIG. 2.

Action 3020: The network node 110 determines whether the estimated number of PRBs fulfils one or more predetermined conditions. Some non-limiting examples of such predetermined conditions will now be described.

One of the one or more predetermined conditions may be related to the number of UEs 120 to be scheduled in the UL. When the number of UEs 120 to be scheduled is one, the network node determines to schedule the UE 120 using FSS. In other words, when there is only one schedulable UE 120 in UL, then the network node always uses FSS to schedule the UE 120. Since there is only one UE 120 to be scheduled in the UL, no other UEs 120 have to be taken into account and thus the single UE 120 may always be scheduled in the frequency spectrum having the best radio conditions.

A second condition out of the one or more predetermined conditions may also relate to the number of UEs 120 to be scheduled in UL but does also consider the number of PRBs estimated for each individual UE 120. When the number of schedulable UEs 120 is two, and the number of estimated PRBs to be scheduled for a first UE out of the two UEs is A and the number of estimated PRBs to be scheduled for a second UE out of the two UEs is B, A/2+B is less than or equal to half of the number of available PRBs (Nprb) in the UL. This second condition may also be described as:

Assume A and B are the PRBs of two UEs 120 that needs to be scheduled. If the estimated PRBs for these UEs satisfy A/2+B<=Nprb/2 then the network node 110 determines to schedule the UEs 120 using FSS. If A/2+B>Nprb/2 then the network node 110 determines to schedule the UEs 120 using resource fair scheduling.

Figure 4:
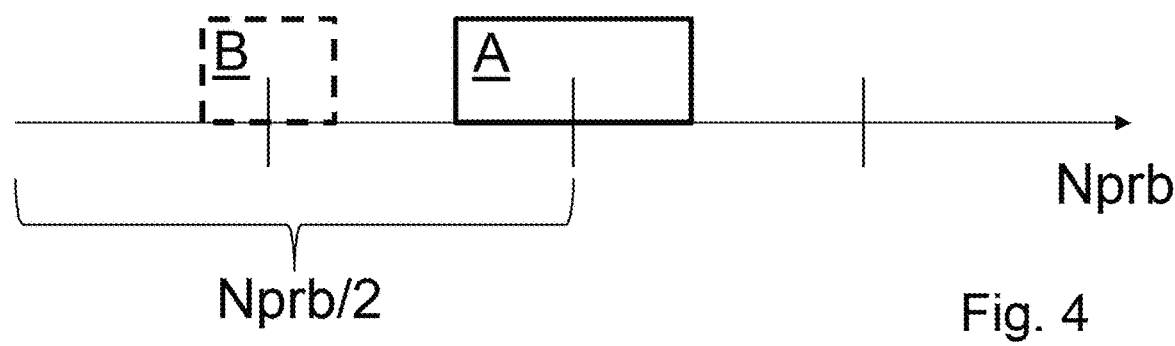
FIG. 4 is a schematic diagram illustrating a first condition for selecting a scheduling scheme according to embodiments herein.

This second condition shall be interpreted as the PRBs A for the first UE 120 being scheduled first in the frequency spectrum. When the PRBs A are scheduled in the frequency spectrum there will be a span of frequencies available on either side of the PRBs A for scheduling the PRBs B of the second UE 120. In a worst case scenario from a capacity point of view, the PRBs A are scheduled in the center of the frequency spectrum, this will leave the least amount of consecutive PRBs for scheduling the PRBs B. Hence, this scenario, which is shown in FIG. 4, is used as one of the conditions. When the PRBs A are scheduled in the center of the frequency spectrum there is an equal amount of PRBs available for scheduling the PRBs B on either side of the PRBs A. The number of PRBs available for scheduling the PRBs B is half of the total number of PRBs in the uplink minus half of the number of PRBs A, i.e.

$$\frac{Nprb}{2} - \frac{A}{2}.$$

hence, it the number of PRBs B to be scheduled for the second UE 120 is less than the remaining number of PRBs on either side of the PRBs A in the spectrum, i.e.

$$B \leq \frac{Nprb}{2} - \frac{A}{2},$$

then the UEs 120 are scheduled using FSS.

A third condition out of the one or more predetermined conditions may be that, when the number of schedulable UEs 120 is three and the number of estimated PRBs to be scheduled for a first UE out of the three UEs is A, the number of estimated PRBs to be scheduled for a second UE out of the three UEs is B and the number of estimated PRBs to be scheduled for a third UE out of the three UEs is C, A/2+B/2+C is less than or equal to a fourth of the Nprb. This third condition may also be described as:

If there are three schedulable UEs 120 in the UL, then if A/2+B/2+C<=Nprb/4 is satisfied the network node 110 determines to schedule the UEs 120 using FSS, if the above is not satisfied then the network node 110 uses resource fair scheduling.

Figure 5:
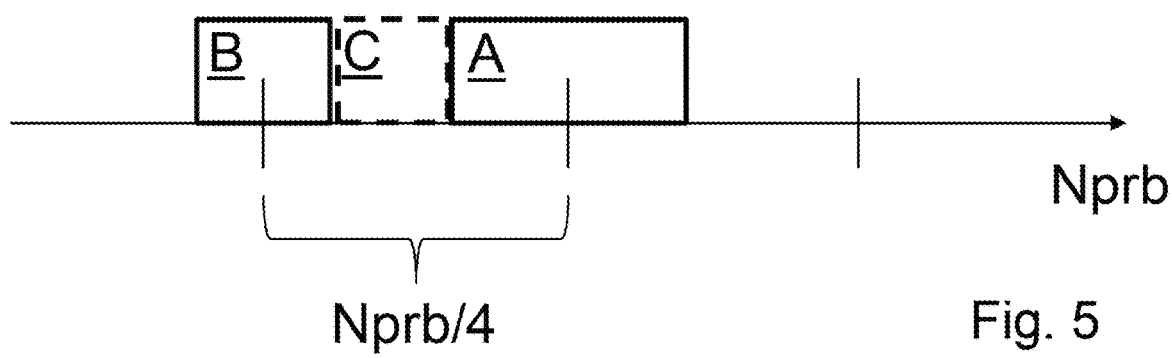
FIG. 5 is a schematic diagram illustrating a second condition for selecting a scheduling scheme according to embodiments herein.

This third condition follows the reasoning of the second condition. The PRBs A of the first UE 120 are scheduled firstly, the PRBs B of the second UE 120 are scheduled secondly and the PRBs C of the third UE 120 are scheduled thirdly. In a worst case scenario from a capacity point of view, the PRBs A are scheduled in the center of the frequency spectrum, the PRBs B are further scheduled at a quarter of the frequency spectrum on either side of the PRBs A. This will leave the least amount of consecutive PRBs for scheduling the PRBs C. Hence, this scenario, which is shown in FIG. 5, is used as a condition. The number of PRBs available for scheduling the PRBs C is the remaining number of PRBs in between the scheduled PRBs A and PRBs B, i.e.

$$\frac{Nprb}{4} - \frac{A}{2} - \frac{B}{2}.$$

Hence, if the number of PRBs C to be scheduled for the third UE 120 is less than the remaining number of consecutive PRBs between the PRBs A and B when the PRBs A are scheduled in the center of the frequency spectrum and the PRBs B are scheduled at a quarter of the frequency spectrum on either side of the PRBs A, i.e. when $$C \leq \frac{Nprb}{4} - \frac{A}{2} - \frac{B}{2},$$

then the UEs 120 are scheduled using FSS.

A fourth condition out of the one or more predetermined conditions may be that if the sum of the estimated PRBs for all schedulable UEs 120 is less than or equal to a percentage of the Nprb, then FSS is used. This fourth condition may also be described as:

If (A+B+C . . . )<=(threshold×Nprb) is true then use FSS, else use Resource fair scheduling. The threshold corresponds to a percentage of the Nprb and may be a value between 0.1-1 corresponding to a percentage of 1 to 100. The threshold may be configurable.

This fourth condition may check if the sum of the estimated PRBs for the UEs to be scheduled in the UL is less than a certain percentage of the available PRBs in the UL, in order to make sure that there are enough PRBs in the UL to accommodate all of the schedulable UEs 120.

A fifth condition out of the one or more predetermined conditions may be that if the number of estimated PRBs to be scheduled for each UE 120 in UL is less than or equal to a percentage of the number of available PRBs in the UL, Nprb, then FSS is used. This fifth condition may also be described as:

If {(A<=threshold×Nprb) (B<=threshold×Nprb)} is true then use FSS, else use resource fair scheduling. The threshold corresponds to a percentage of the Nprb and may be a value between 0.1-1 corresponding to a percentage of 1 to 100. The threshold may be configurable.

This fifth condition checks if the number of estimated PRBs for a single UE is more than a certain amount of the total PRBs available in the UL.

A sixth condition out of the one or more predetermined conditions may be that if a maximum estimated PRBs of a schedulable UE 120 is less than or equal to a total sum of all the estimated PRBs for the remaining schedulable UEs and the total sum of all the estimated PRBs for all schedulable UEs 120 is less than or equal to the number of available PRBs in the UL, Nprb, then FSS is used. The maximum estimated PRBs of a schedulable UE 120 shall herein be interpreted as the number of PRBs for the UE 120 having the highest number of estimated PRBs to be scheduled out of all of the schedulable UEs 120. This sixth condition may also be described as:

If (MaxEstimatedPRB_UEx<=EstimatedPRBUEn−1+ EstimatedPRBUEn−2 EstimatedPRBUEn−(n−1) && (SumEstimatedPRB (n+n−1+n−2+n−(n−1))<=Nprb)) is true then use FSS, else use Resource Fair scheduling.

This action 3020 is similar to the action 202 described in relation to FIG. 2.

Action 3030: The network node 110 determines to schedule the at least one UE 120 using FSS when at least one of the one or more conditions are fulfilled, and determines to schedule the at least one UE 120 using resource fair scheduling when none of the one or more predetermined conditions are fulfilled. Hence, the network node 110 may evaluate at least one of the one or more conditions. As soon as one of the one or more conditions indicates that the network node 110 shall schedule the UEs 120 using FSS, the network node may stop the evaluation of the remaining conditions and may schedule the UEs 120 using FSS. As long as the evaluated conditions indicate that FSS shall not be used, the network node 110 continues to evaluate any remaining conditions until a condition indicates the use of FSS or until all conditions have been evaluated and all indicate that resource fair scheduling shall be used. This action 3030 is similar to the action 203a and 203b described in relation to FIG. 2.

Figure 6:
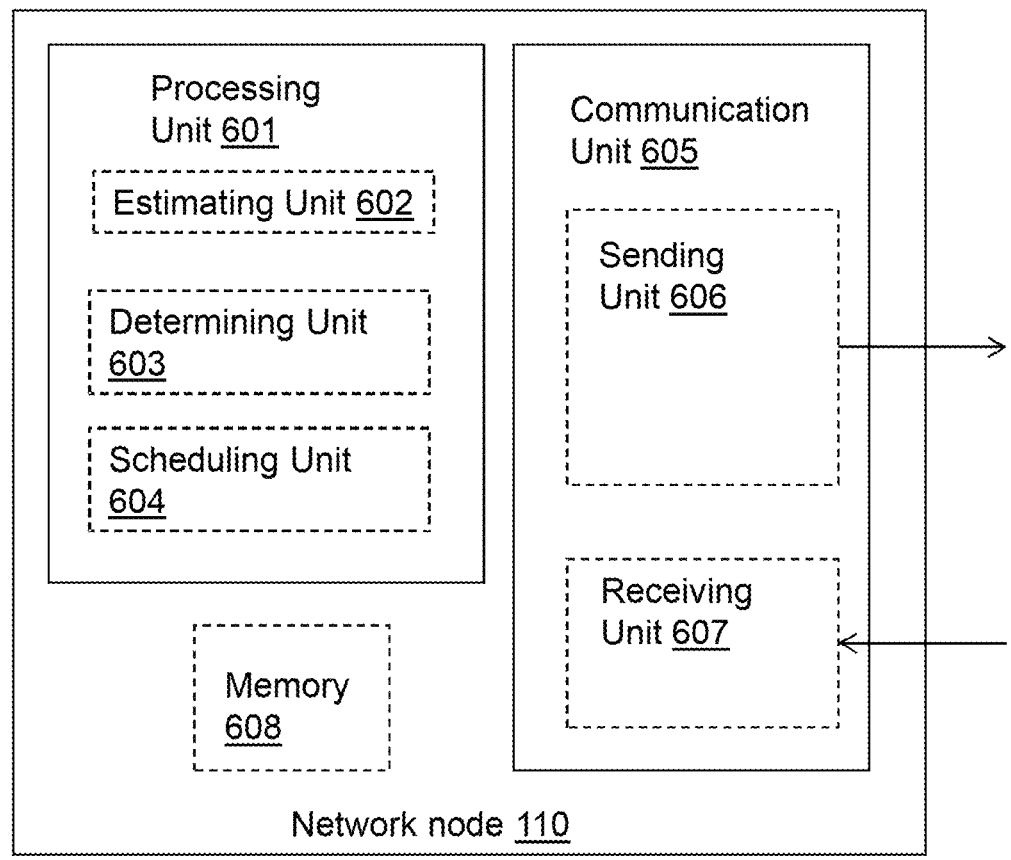
FIG. 6 is a schematic block diagram illustrating an example of how the network node may be structured according to some further embodiments herein.
Figure 6:
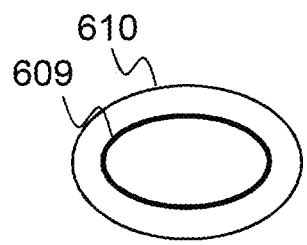

To perform the method actions for scheduling of at least one UE 120 in UL, described above in relation to FIG. 3, the network node 110 may comprise the following arrangement as depicted in FIG. 6. The network node 110 is configured to schedule UEs using FSS or resource fair scheduling.

The network node 110 may comprise a processing unit 601, such as e.g. one or more processors, an estimating unit 602, a determining unit 603 and a scheduling unit 604 as exemplifying hardware units configured to perform the methods described herein. The network node 110 may further comprise a communication unit 605 for communicating with network devices, such as other network nodes 110, 111, 140 or the UE 120. The communication unit may comprise a sending unit 606 for sending information to network devices and a receiving unit 607 for receiving information from network devices.

The network node 110 is configured to, e.g. by means of the processing unit 601, the estimating unit 602 and/or the determining unit 603 being configured to, estimate a number of PRBs for the at least one individual UE 120. Wherein the at least one individual UEs 120 are scheduled in the same cell and TTI.

The network node 110 is configured to, e.g. by means of the processing unit 601 and/or the determining unit 603 being configured to, determine whether the estimated number of PRBs fulfil one or more predetermined conditions.

The network node 110 is configured to, e.g. by means of the processing unit 601 and/or the determining unit 603 being configured to, determine to schedule the at least one UE using FSS when at least one of the one or more conditions are fulfilled, and determining to schedule the at least one UE using resource fair scheduling when none of the one or more predetermined conditions are fulfilled.

The network node 110 may be configured to, e.g. by means of the processing unit 601 and/or the determining unit 603 being configured to, determine to schedule the at least one UE 120 using FSS when the number of UEs 120 to be scheduled is one.

The network node 110 may be configured to, e.g. by means of the processing unit 601 and/or the determining unit 603 being configured to, determine to schedule the at least one UE 120 using FSS, when the number of schedulable UEs 120 is two, the number of estimated PRBs to be scheduled for a first UE out of the two UEs is A and the number of estimated PRBs to be scheduled for a second UE out of the two UEs is B, and A/2+B is less than or equal to half of the Nprb.

The network node 110 may be configured to, e.g. by means of the processing unit 601 and/or the determining unit 603 being configured to, determine to schedule the at least one UE 120 using FSS, when the number of schedulable UEs 120 is three, the number of estimated PRBs to be scheduled for a first UE out of the three UEs is A, the number of estimated PRBs to be scheduled for a second UE out of the three UEs is B and the number of estimated PRBs to be scheduled for a third UE out of the three UEs is C, and A/2+B/2+C is less than or equal to a fourth of the Nprb.

The network node 110 may be configured to, e.g. by means of the processing unit 601 and/or the determining unit 603 being configured to, determine to schedule the at least one UE 120 using FSS, when the sum of the estimated PRBs for all schedulable UEs 120 is less than or equal to a percentage of the Nprb.

The network node 110 may be configured to, e.g. by means of the processing unit 601 and/or the determining unit 603 being configured to, determine to schedule the at least one UE 120 using FSS, when the number of estimated PRBs to be scheduled for each UE 120 in UL is less than or equal to a percentage of the Nprb.

The network node 110 may be configured to, e.g. by means of the processing unit 601 and/or the determining unit 603 being configured to, determine to schedule the at least one UE 120 using FSS, when a maximum estimated PRB of a schedulable UE 120 is less than or equal to a total sum of all the estimated PRBs for the remaining schedulable UEs and in addition that the total sum of all the estimated PRBs for all schedulable UEs 120 is less than or equal to the Nprb.

The network node 110 may further comprise a memory 608. The memory 608 comprises one or more memory units to be used to store data on, such as system information, configurations and/or applications to perform the methods disclosed herein when being executed, and similar.

Those skilled in the art will also appreciate that the estimating unit 602, the determining unit 603 and the scheduling unit 603 described above may refer to a combination of analog and digital circuits, and/or one or more processors configured with software and/or firmware, e.g. stored in the memory 608, that when executed by the one or more processors such as the processing unit 601 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as the processor 601 of a processing circuitry in the network node 110 depicted in FIG. 6, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

Figure 3:
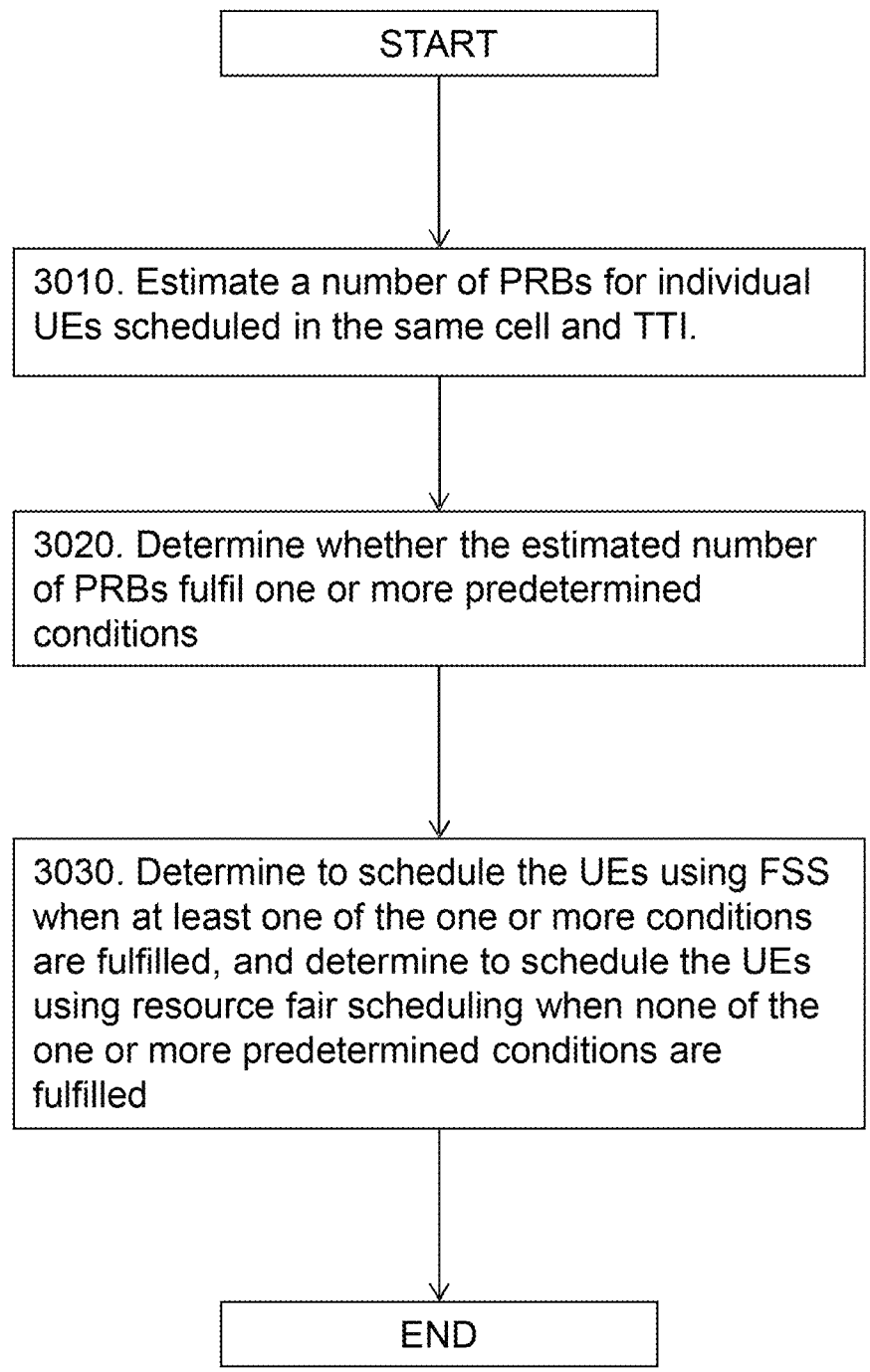
FIG. 3 is a flowchart depicting a method performed by a network node according to embodiments herein.
Figure 7:
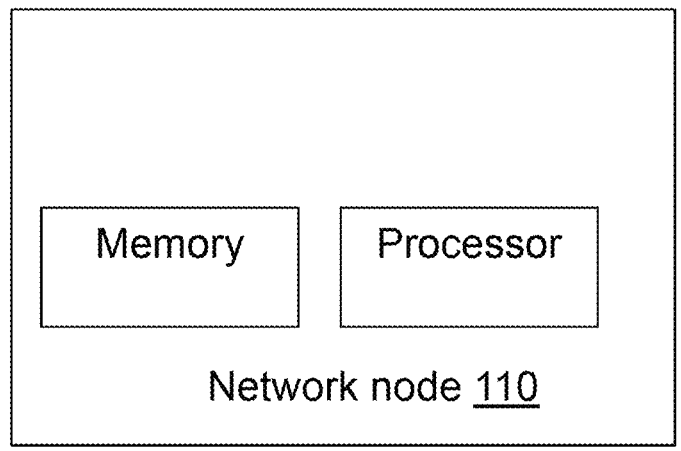
FIG. 7 is a schematic block diagram illustrating another example of how the network node may be structured according to some further embodiments herein.
Figure 7:
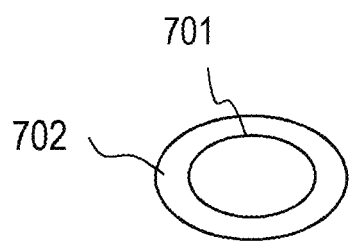

The embodiments herein for scheduling of a UE 120 in UL may be implemented through a respective processor or one or more processors of a processing circuitry in the network node 110 as depicted in FIG. 7, which processing circuitry is configured to perform the method actions according to FIG. 3 and the embodiments described above for the network node 110.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as e.g. a memory stick. The computer program code may furthermore be provided as pure program code on a server and downloaded to the network node 110.

The network node 110 may further comprise a memory. The memory may comprise one or more memory units to be used to store data on, such as the numbers determined to be related to a non-legitimate device, software, patches, system information (SI), configurations, diagnostic data, performance data and/or applications to perform the methods disclosed herein when being executed, and similar.

The method according to the embodiments described herein for the network node 110 may be implemented by means of e.g. a computer program product 609, 701 or a computer program, comprising instructions, i.e., software code portions, which, when executed on at least one processor, cause at least one processor to carry out the actions described herein, as performed by the UE 120. The computer program product 609, 701 may be stored on a computer-readable storage medium 610, 702, e.g. a disc or similar. The computer-readable storage medium 610, 702, having stored thereon the computer program, may comprise instructions which, when executed on at least one processor, cause the at least one processor to carry out the actions described herein, as performed by the network node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the network node 110.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-oFSS inherent in these design choices.

When using the word "comprise" or "comprising" it shall be interpreted as non-limiting, i.e. meaning "consist at least of".

Further Extensions and Variations

Figure 8:
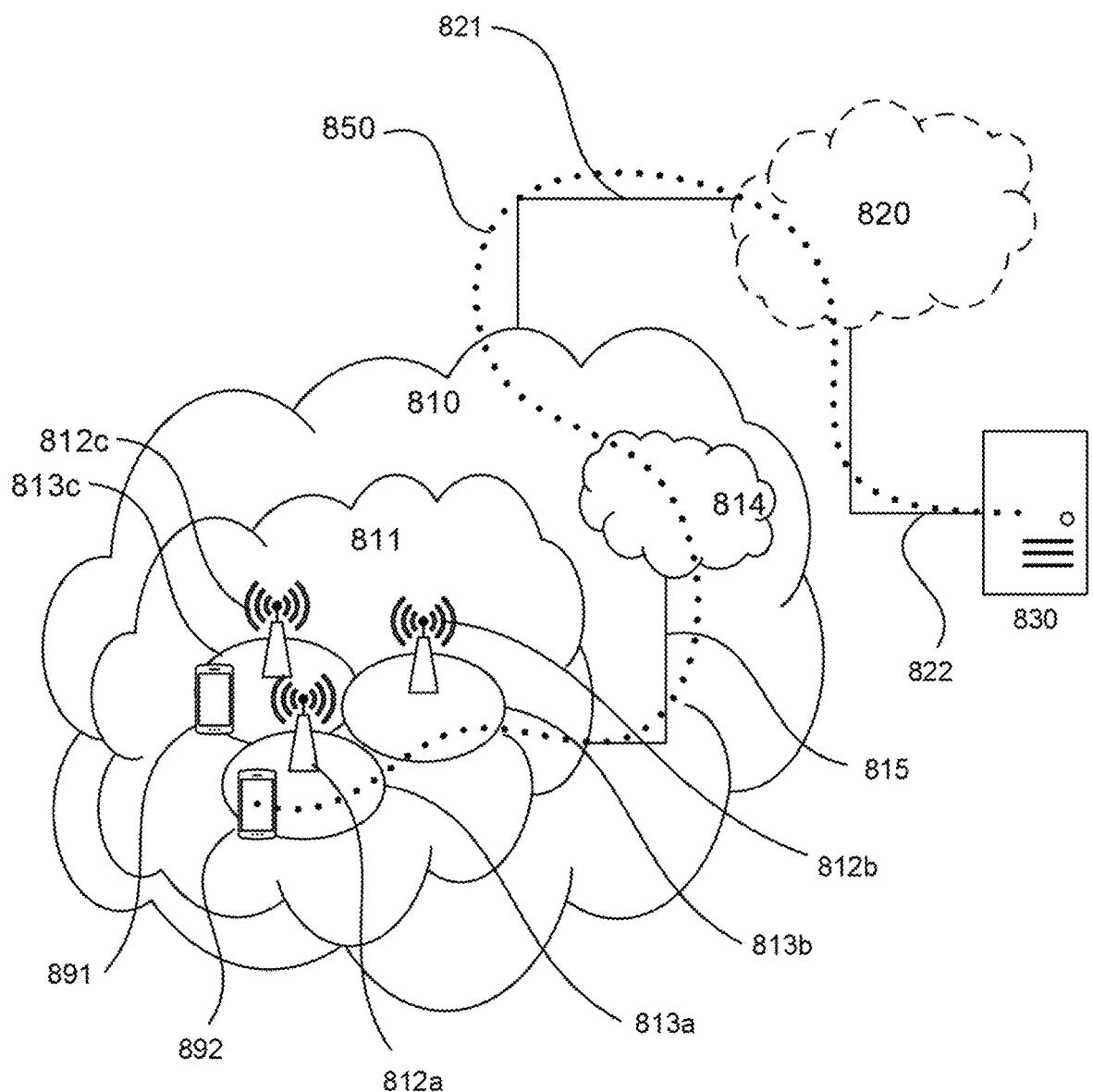
FIG. 8 is a schematic block diagram illustrating a host computer communicating via a base station with a user equipment over a partially wireless connection in accordance with some embodiments.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, e.g. the network node 110, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891, such as the UE 120, located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink (UL) and downlink (DL) communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
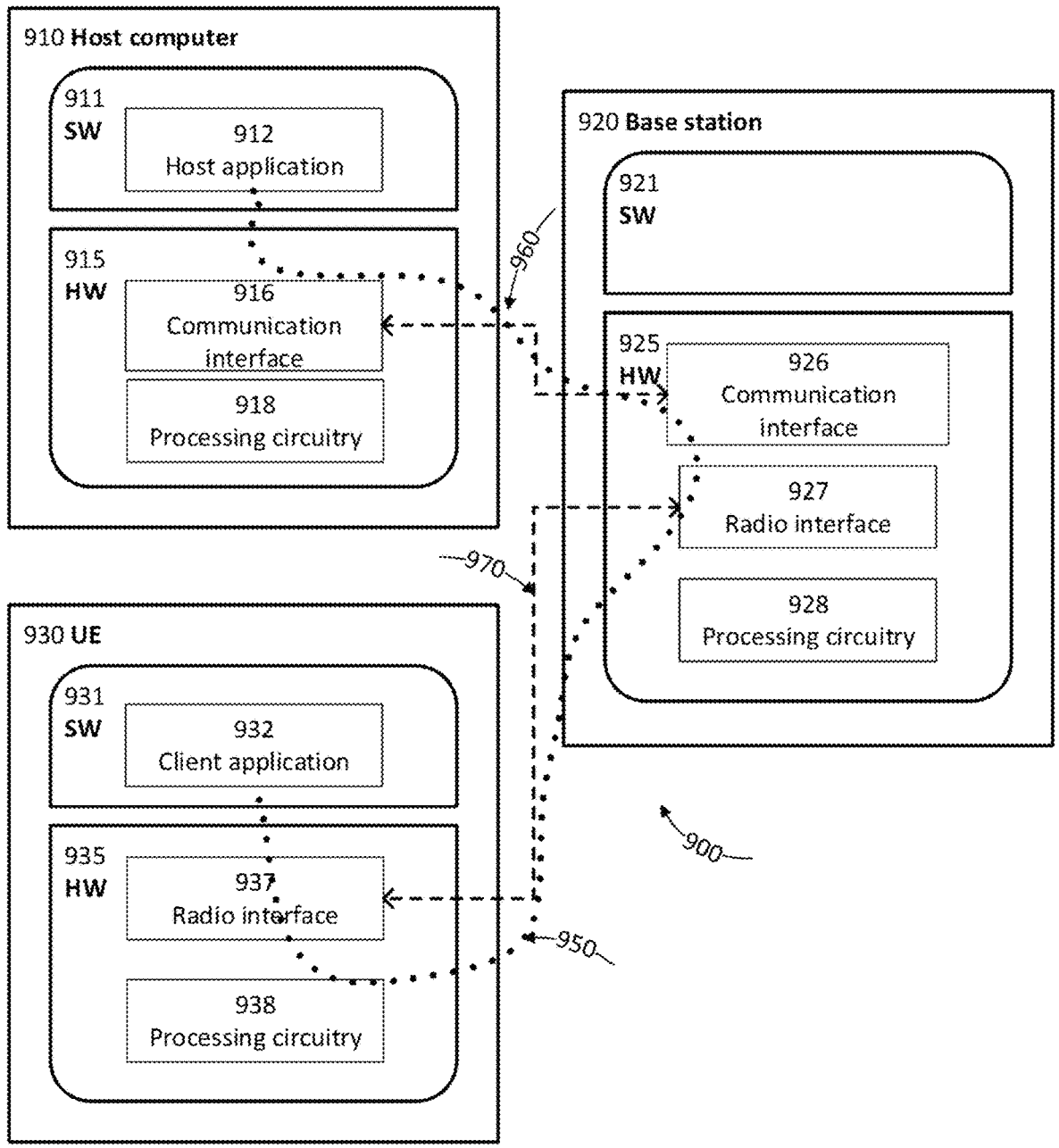
FIG. 9 is a schematic overview of a host computer communicating via a base station with a user equipment over a partially wireless connection in accordance with some embodiments.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the robustness or spectral efficiency of signaling and thereby provide benefits such as improved performance of the communications network, in particular when transmitting data in the UL.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figures 10, 11:
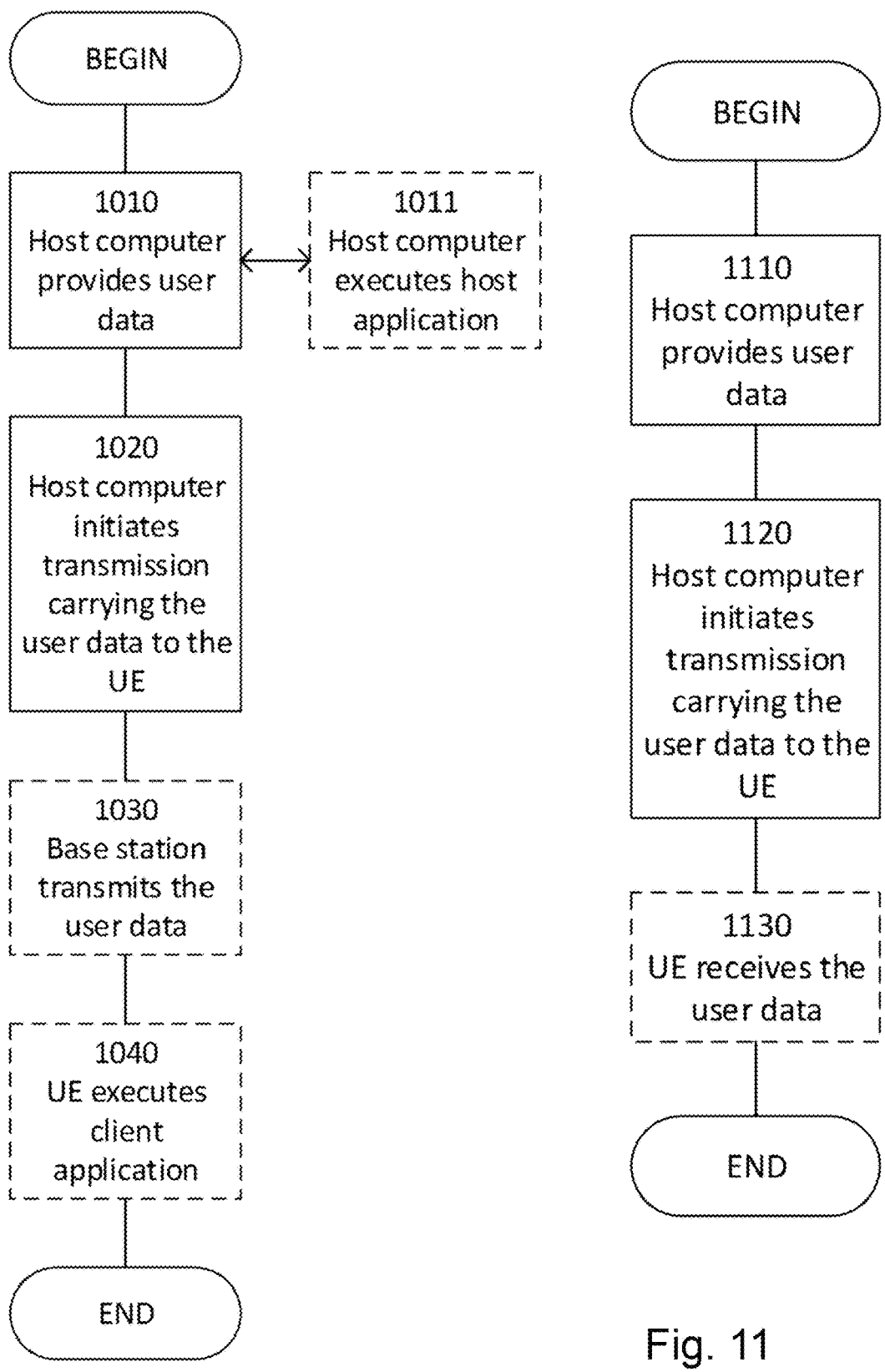
FIG. 10 is a flowchart depicting methods implemented in a communication system including a host computer, a base station and a user equipment in accordance with some embodiments.
FIG. 11 is a flowchart depicting methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method performed by a network node, for scheduling of at least one User Equipment, UE, in Uplink, UL, wherein the network node is configured to schedule UEs using Frequency Selective Scheduling, FSS, or resource fair scheduling, the method comprising:
   obtaining a number of schedulable UEs in the UL,
   estimating a number of Physical Resource Blocks, PRBs, for the at least one individual UE based on the number of schedulable UEs in the UL, wherein the at least one UE is scheduled in the same cell and Transmit Time Interval, TTI, as the number of schedulable UEs in the UL,
   determining whether the estimated number of PRBs fulfil one or more predetermined conditions, and
   determining to schedule the at least one UE using FSS when at least one of the one or more predetermined conditions are fulfilled, and determining to schedule the at least one UE using resource fair scheduling when none of the one or more predetermined conditions are fulfilled,
   wherein the one or more predetermined conditions are based on the number of schedulable UEs in the UL, the number of estimated PRBs to be scheduled for each of the schedulable UEs in the UL, and a total number of available PRBs for scheduling UEs, Nprb,
   wherein the step of determining to schedule the at least one UE comprises a mechanism of adaptively switching between FSS and resource fair scheduling, wherein the mechanism is selecting one of FSS or resource fair scheduling based on whether the one or more predetermined conditions are fulfilled.

2. The method according to claim 1, wherein one of the one or more predetermined conditions is related to the number of schedulable UEs in the UL and wherein when the number of schedulable UEs in the UL is one, the at least one UE is determined to be scheduled using FSS.

3. The method according to claim 1, wherein one of the one or more predetermined conditions is, A/2+B<=Nprb/2, wherein when the number of schedulable UEs is two, A is the number of estimated PRBs to be scheduled for a first UE out of the two schedulable UEs and B is the number of estimated PRBs to be scheduled for a second UE out of the two schedulable UEs.

4. The method according to claim 1, wherein one of the one or more predetermined conditions is A/2+B/2+C<=Nprb/4, wherein, when the number of schedulable UEs is three, A is the number of estimated PRBs to be scheduled for a first UE out of the three schedulable UEs, B is the number of estimated PRBs to be scheduled for a second UE out of the three schedulable UEs, and C is the number of estimated PRBs to be scheduled for a third UE out of the three schedulable UEs.

5. The method according to claim 1, wherein one of the one or more predetermined conditions is that the sum of the estimated PRBs for all schedulable UEs is less than or equal to a percentage of the number of available PRBs in the UL, Nprb.

6. The method according to claim 1, wherein one of the one or more predetermined conditions is that the number of estimated PRBs to be scheduled for each UE in UL is less than or equal to a percentage of the number of available PRBs in the UL, Nprb.

7. The method according to claim 1, wherein one of the one or more predetermined conditions is that a maximum number of estimated PRBs of a schedulable UE is less than or equal to a total sum of all the estimated PRBs for the remaining schedulable UEs and the total sum of all the estimated PRBs for all schedulable UEs is less than or equal to the number of available PRBs in the UL, Nprb.

8. A computer program stored on a non-transitory computer-readable medium, comprising instructions, which when executed by a processor, causes the processor to perform actions according to claim 1.

9. A network node, for scheduling of at least one User Equipment, UE, in Uplink, UL, wherein the network node is configured to schedule UEs using Frequency Selective Scheduling, FSS, or resource fair scheduling, wherein the network node is configured to:
   obtaining a number of schedulable UEs in the UL,
   estimate a number of Physical Resource Blocks, PRBs, for the at least one UE based on the number of schedulable UEs in the UL, wherein the at least one UE is scheduled in the same cell and Transmit Time Interval, TTI, as the number of schedulable UEs in the UL,
   determine whether the estimated number of PRBs fulfil one or more predetermined conditions, and
   determine to schedule the at least one UE using FSS when at least one of the one or more predetermined conditions are fulfilled, and determining to schedule the at least one UE using resource fair scheduling when none of the one or more predetermined conditions are fulfilled,
   wherein the one or more predetermined conditions are based on the number of schedulable UEs in the UL, the number of estimated PRBs to be scheduled for each of the schedulable UEs in the UL, and a total number of available PRBs for scheduling UEs, Nprb,
   wherein the step of determining to schedule the at least one UE comprises a mechanism of adaptively switching between FSS and resource fair scheduling, wherein the mechanism is selecting one of FSS or resource fair scheduling based on whether the one or more predetermined conditions are fulfilled.

10. The network node according to claim 9, wherein one of the one or more predetermined conditions is related to the number of schedulable UEs in the UL and wherein when the number of schedulable UEs in the UL is one, the at least one UE is determined to be scheduled using FSS.

11. The network node according to claim 9, wherein one of the one or more predetermined conditions is $A/2+B<=Nprb/2$, wherein when the number of schedulable UEs is two, A is the number of estimated PRBs to be scheduled for a first UE out of the two schedulable UEs and B is the number of estimated PRBs to be scheduled for a second UE out of the two schedulable UEs.

12. The network node according to claim 9, wherein one of the one or more predetermined conditions is $A/2+B/2+C<=Nprb/4$, wherein when the number of schedulable UEs is three, A is the number of estimated PRBs to be scheduled for a first UE out of the three schedulable UEs, B is the number of estimated PRBs to be scheduled for a second UE out of the three schedulable UEs, and C is the number of estimated PRBs to be scheduled for a third UE out of the three schedulable UEs.

13. The network node according to claim 9, wherein one of the one or more predetermined conditions is that the sum of the estimated PRBs for all schedulable UEs is less than or equal to a percentage of the number of available PRBs in the UL, Nprb.

14. The network node according to claim 9, wherein one of the one or more predetermined conditions is that the number of estimated PRBs to be scheduled for each UE in UL is less than or equal to a percentage of the number of available PRBs in the UL, Nprb.

15. The network node according to claim 9, wherein one of the one or more predetermined conditions is that a maximum number of estimated PRBs of a schedulable UE is less than or equal to a total sum of all the estimated PRBs for the remaining schedulable UEs and the total sum of all the estimated PRBs for all schedulable UEs is less than or equal to the number of available PRBs in the UL, Nprb.

* * * * *